UNITED STATES PATENT OFFICE.

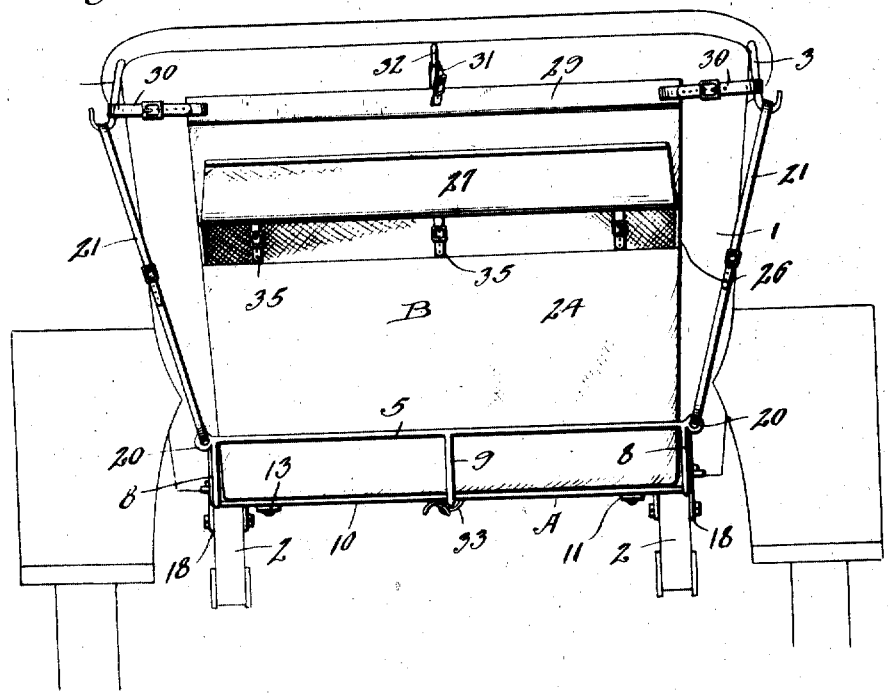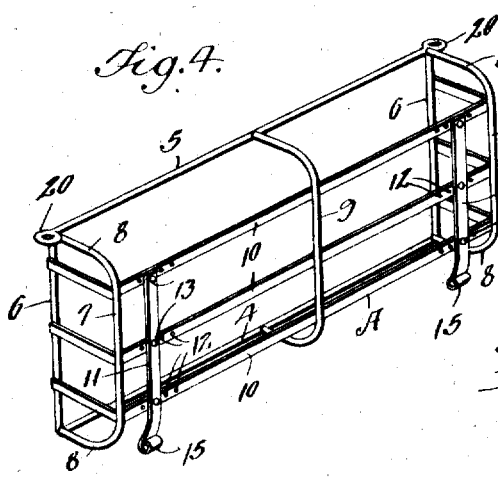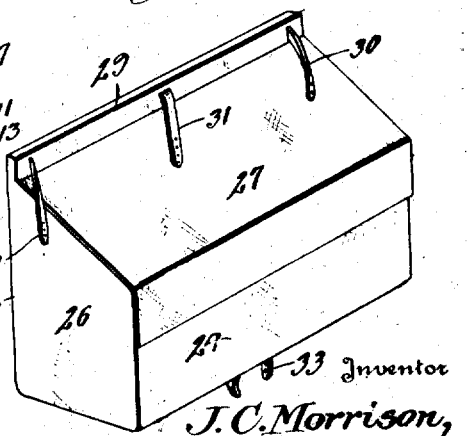

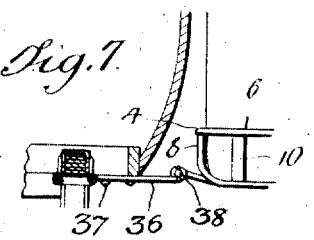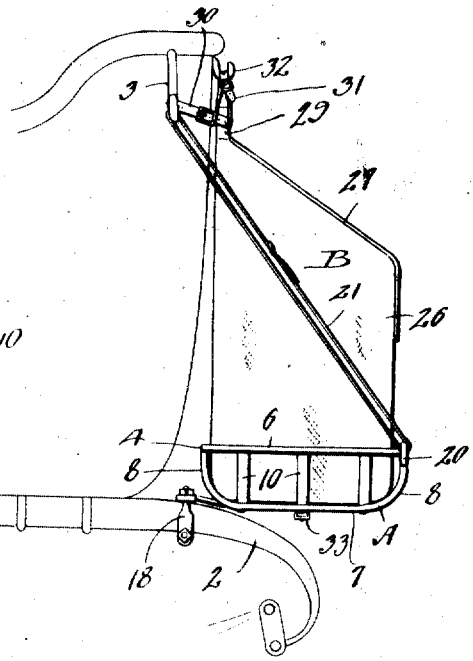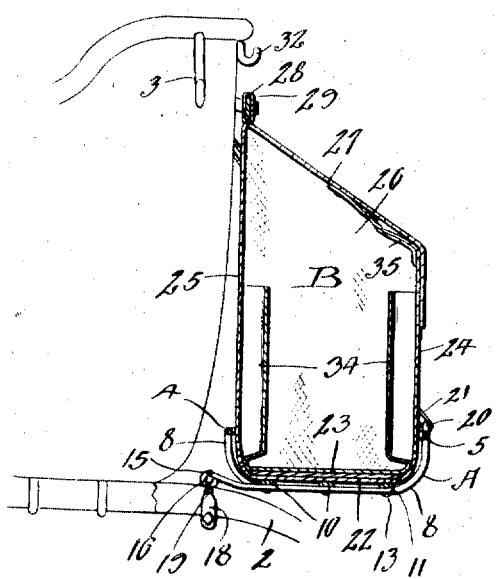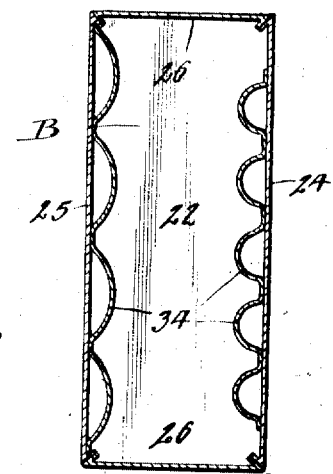

JOHN C. MORRISON, OF SPOKANE, WASHINGTON.

LUGGAGE-CARRIER.

1,232,371.  Specification of Letters Patent.  Patented July 3, 1917.

Application filed December 20, 1916. Serial No. 138,069.

*To all whom it may concern:*

Be it known that I, JOHN C. MORRISON, a citizen of the United States, residing at Spokane, in the county of Spokane and State of Washington, have invented new and useful Improvements in Luggage-Carriers, of which the following is a specification.

This invention relates to luggage carriers for motor vehicles, the object in view being to provide a device of the character referred to which may be applied to automobiles and which combines in connection with a carrier or basket, a flexible container, the said carrier and container being so combined with each other and being so mounted in relation to the body of the vehicle, that ready access may be had to the container for removing articles therefrom and replacing the same therein.

One of the main objects of the invention is to provide novel means for so mounting the carrier and flexible container that all ordinary road shocks will be absorbed before reaching the container, thereby particularly adapting the device as a whole for touring purposes. The device will be found convenient and valuable to campers, hunters, cross country tourists, agents, drummers and various other persons who find it necessary to cover long distances over country roads and carry a larger equipment or amount of goods than is possible to be carried in the ordinary compartments of the present day automobile.

With the above and other objects in view, the invention consists in the novel construction, combination and arrangement of parts, herein described, illustrated and claimed.

In the accompanying drawings:—

Figure 1 is a rear elevation showing the luggage carrier in its applied relation to the body of a vehicle.

Fig. 2 is a side elevation of the vehicle showing the luggage carrier in its carrying position.

Fig. 3 is a similar view showing the luggage carrier in section.

Fig. 4 is a bottom perspective view of the carrier.

Fig. 5 is a detached perspective view of the container.

Fig. 6 is a horizontal section through the container.

Fig. 7 is a fragmentary vertical section showing another way of attaching the carrier or basket to the body or frame of a vehicle.

Referring to the drawings 1 designates the body of an automobile, 2 the supporting springs thereof and 3 the usual brackets which support the top (not shown) of the vehicle when said top is folded and lowered, said parts being of the usual construction and arrangement now in common use.

In carrying out the present invention, I construct a carrier or basket designated generally at A, the same comprising the front and rear horizontal bars 4 and 5, respectively, the end bars 6, end struts or stringers 7 having their opposite end portions 8 deflected and terminally fastened to the corners of the frame formed by the bars 4, 5 and 6, one or more intermediate struts or stringers 9 corresponding in shape and arrangement to the end members 7, and longitudinal tie bars 10 which are fastened to the members 7 and 9 where they cross or intersect. The end portions of the bars 10 are extended at an angle along the ends of the basket and are terminally fastened to the bars 6.

Supporting straps or hangers 11 are fastened to the bars 10 adjacent to the opposite ends of the carrier or basket, the bars 10 being formed with a longitudinal series of holes 12 to receive fasteners 13 which are inserted through corresponding holes in the straps or hangers 11 as shown, the carrier or basket being thus fixedly secured to said straps or hangers. Each of the straps or hangers 11 is provided at its inner end with a sleeve or knuckle 15 which receives and is journaled upon a hinge pin or stud 16 projecting from a U-shaped clip 18 which embraces the top run of the adjacent body supporting spring 2, the hinge pin 16 being formed with a hole to receive a retaining fastener 19. This provides for a pivotal connection between the carrier or basket A and the body supporting vehicle springs so that the basket is yieldingly supported in relation to the rear axle housing of the vehicle.

At its outer opposite corners, the carrier or basket A is provided with loops or eyes 20 to receive straps 21 which engage the brackets 3 for the purpose of supporting the carrier in the upright position illustrated in Fig. 2, said straps being of leather or other flexible and yieldable material having shock absorbing qualities.

A flexible container designated generally at B shaped to correspond substantially with the interior dimensions of the carrier or basket A and composed of leather, canvas or other tough flexible material, comprises a bottom 22 having a stiffening or reinforcing member 23 associated therewith and fastened thereto, front and back walls 24 and 25, respectively, end walls 26 and a flap or cover 27. A metal stiffening strip or bar 28 extends through a hem 29 along the top edges of the container so as to prevent sagging of the flexible container, and end straps 30 and one or more intermediate straps 31 are passed through said strip or hanger 28, the same being designed to be connected detachably to the bracket 3 and to one or more intermediate keepers 32 fastened to the body 1 of the vehicle. One or more straps 33 are fastened to the bottom of the flexible container and are designed to be passed around the member or members 9 of the carrier or basket A for anchoring the bottom of the container to the bottom of said carrier or basket in order that the container may not become accidentally disconnected from the carrier. The container is also provided interiorly with pockets 34 to receive smaller articles while the main or heavier articles are supported upon the bottom 22 of the container. Straps 35 arranged under the flap 27 are employed to fasten said flap closed.

By reason of the construction hereinabove described and illustrated, the device as a whole is resiliently supported by reason of the mounting thereof upon the body supporting springs 2 and the employment of the suspending straps for the container and also by reason of the flexibility of the container itself. By loosening the straps 30, 31 and 33 the flexible container may be detached and removed from the carrier or basket. Articles may be readily removed from the container and replaced therein while the container is still supported by the means above described.

In certain cars where the body supporting springs are extended transversely or substantially parallel to the axles, I employ supporting members 36 (see Fig. 7) which are bolted, riveted or otherwise fastened to the body or frame of the machine as shown at 37 and connect the carrier or basket A thereto by pins 38 corresponding in arrangement and function with the hinge pins 16 hereinabove referred to.

I claim:—

The combination of a skeleton carrier adapted to be attached to the rear of a vehicle body, a flexible container having the bottom portion thereof positioned within said carrier, and means for detachably fastening said container along its upper edge to the vehicle body, said means comprising a stiffening strip incased in the upper margin of said container, and flexible supporting straps attached to said stiffening strip and adapted to be detachably connected to the vehicle body.

In testimony whereof I affix my signature.

JOHN C. MORRISON.